(12) United States Patent
Forrester

(10) Patent No.: US 8,796,501 B2
(45) Date of Patent: Aug. 5, 2014

(54) METHOD FOR TREATMENT OF HAZARDOUS PAINT RESIDUE

(71) Applicant: Keith E. Forrester, Meredith, NH (US)

(72) Inventor: Keith E. Forrester, Meredith, NH (US)

( * ) Notice: Subject to any disclaimer, the term of this patent is extended or adjusted under 35 U.S.C. 154(b) by 32 days.

(21) Appl. No.: 13/658,728

(22) Filed: Oct. 23, 2012

(65) Prior Publication Data

US 2013/0098269 A1    Apr. 25, 2013

Related U.S. Application Data

(60) Provisional application No. 61/550,770, filed on Oct. 24, 2011.

(51) Int. Cl.
    *A62D 3/33*    (2007.01)
(52) U.S. Cl.
    USPC .......................... 588/315; 588/412
(58) Field of Classification Search
    USPC ................. 588/315, 410, 412, 901
    See application file for complete search history.

(56) References Cited

U.S. PATENT DOCUMENTS

| | | |
|---|---|---|
| 4,652,381 A | 3/1987 | Inglis |
| 4,889,640 A | 12/1989 | Stanforth |
| 4,955,519 A | 9/1990 | Forrester |
| 5,037,479 A | 8/1991 | Stanforth |
| 5,040,920 A | 8/1991 | Forrester |
| 5,202,033 A | 4/1993 | Stanforth et al. |
| 5,245,114 A | 9/1993 | Forrester |
| 5,430,233 A | 7/1995 | Forrester |
| 5,536,899 A | 7/1996 | Forrester |
| 5,637,355 A | 6/1997 | Stanforth et al. |
| 5,667,696 A | 9/1997 | Studer et al. |
| 5,674,108 A | 10/1997 | Rolle |
| 5,722,928 A | 3/1998 | Forrester |
| 5,827,574 A | 10/1998 | Stanforth |
| 5,846,178 A | 12/1998 | Forrester |
| 5,860,908 A | 1/1999 | Forrester |
| 5,902,392 A | 5/1999 | Henkelman et al. |
| 6,001,185 A | 12/1999 | Huff |
| 6,050,929 A | 4/2000 | Forrester |
| 6,089,955 A | 7/2000 | Rolle |
| 6,186,939 B1 | 2/2001 | Forrester |
| 6,471,751 B1 | 10/2002 | Semanderes |
| 6,515,053 B1 | 2/2003 | Forrester |
| 6,688,811 B2 | 2/2004 | Forrester |
| 7,736,291 B2 | 6/2010 | Forrester |
| 8,037,479 B2 | 10/2011 | Hambrick et al. |
| 2003/0143031 A1 | 7/2003 | Forrester |
| 2004/0006253 A1 | 1/2004 | Forrester |
| 2004/0015036 A1 | 1/2004 | Forrester |
| 2004/0018130 A1 | 1/2004 | Forrester |
| 2004/0024281 A1 | 2/2004 | Forrester |
| 2004/0024283 A1 | 2/2004 | Forrester |
| 2004/0034267 A1 | 2/2004 | Forrester |
| 2004/0068156 A1 | 4/2004 | Forrester |
| 2004/0091549 A1 | 5/2004 | Forrester |
| 2004/0116766 A1 | 6/2004 | Forrester |
| 2005/0049449 A1 | 3/2005 | Forrester |
| 2005/0209496 A1 | 9/2005 | Forrester |
| 2005/0209497 A1 | 9/2005 | Forrester |
| 2005/0215841 A1 | 9/2005 | Forrester |
| 2006/0036124 A1 | 2/2006 | Forrester |
| 2009/0093667 A1 | 4/2009 | Forrester |
| 2009/0209800 A1 | 8/2009 | Forrester |

FOREIGN PATENT DOCUMENTS

WO    WO 98/57710 A1    12/1998

OTHER PUBLICATIONS

Federal Register, vol. 55, No. 126, pp. 26986-26998 (Jun. 29, 1990).

*Primary Examiner* — Edward Johnson
(74) *Attorney, Agent, or Firm* — Hamilton, Brooks, Smith & Reynolds, P.C.

(57) ABSTRACT

The invention provides an optimal method for stabilization of heavy metal bearing paint residue subject to acid and water leaching tests or leach conditions by addition of environment safe, worker safe, multi-media compatible, non-separating, non-embedding, stabilizing agent and optional complexing agent(s) to the blast media, thus allowing for pre-blending of stabilizer and blast media and field production of a uniform and steady state stabilizer within media for stabilization outside or within an OSHA containment building or collection device, such that leaching of heavy metals such as lead are inhibited to desired levels. The resultant stabilized paint residue and spent blast media mixture is suitable for on-site reuse, off-site reuse, or disposal as RCRA non-hazardous waste.

16 Claims, No Drawings

US 8,796,501 B2

METHOD FOR TREATMENT OF HAZARDOUS PAINT RESIDUE

RELATED APPLICATION

This application claims the benefit of U.S. Provisional Application No. 61/550,770, filed on Oct. 24, 2011. The entire teachings of the above application are incorporated herein by reference.

BACKGROUND OF THE INVENTION

Heavy metal bearing paint residue, and mixtures of heavy metal bearing paint residue and spent paint removal blasting or abrasive media, may be deemed "Hazardous Waste" by the United States Environmental Protection Agency (USEPA) pursuant to 40 C.F.R. Part 261 and also deemed hazardous under similar regulations in other countries such as Japan, Switzerland, Germany, United Kingdom, Mexico, Australia, Canada, Taiwan, European Countries, India, and China, and deemed special waste within specific regions or states within those countries, if containing hazardous waste regulatory method extraction fluid solution-soluble and/or sub-micron filter-passing particle sized heavy metals such as; Arsenic (As), Silver (Ag), Barium (Ba), Lead (Pb), Cadmium (Cd), Chromium (Cr), Mercury (Hg), Selenium (Se), Copper (Cu), Zinc (Zn), and Antimony (Sb), above levels deemed hazardous by those country, regional and/or state regulators.

In the United States, any solid waste can be defined as Hazardous Waste either because it is "listed" in 40 C.F.R., Part 261 Subpart D, federal regulations adopted pursuant to the Resource Conservation and Recovery Act (RCRA), or because it exhibits one or more of the characteristics of a Hazardous Waste as defined in 40 C.F.R. Part 261, Subpart C. The hazard characteristics defined under 40 CFR Part 261 are: (1) ignitability, (2) corrosivity, (3) reactivity, and (4) toxicity as tested under the Toxicity Characteristic Leaching Procedure (TCLP). 40 C.F.R., Part 261.24(a), contains a list of heavy metals and their associated maximum allowable concentrations, as measured under the USEPA Method 1311 leach test, TCLP. If a heavy metal, such as lead, exceeds its maximum allowable concentration of extract leaching from a solid waste, when tested using the TCLP analysis as specified at 40 C.F.R. Part 261 Appendix 2, then the subject solid waste is classified as a RCRA Characteristic Hazardous Waste. The USEPA TCLP test, Method 1311, uses a dilute acetic acid either in de-ionized water (TCLP fluid 2) or in de-ionized water with a sodium hydroxide buffer (TCLP fluid 1). Both extract methods attempt to simulate the leachate character from a decomposing trash landfill in which the solid waste being tested for is assumed to be disposed in and thus subject to rainwater and decomposing organic matter leachate combination or an acetic acid leaching condition. Wastes containing TCLP leachable heavy metals are currently classified as hazardous waste due to the toxicity characteristic, if the level of TCLP analysis is above 0.2 to 100 milligrams per liter (mg/L) (or parts per million (ppm)) for specific heavy metals as defined under 40 CFR part 261.24. The TCLP test is designed to simulate a worst-case leaching situatio that is a leaching environment typically found in the interior of an actively degrading municipal landfill. Such landfills normally are slightly acidic with a pH of approximately 5±0.5. Countries outside of the US also use the TCLP test as a measure of leaching such as Taiwan, Philippines, and Canada. Thailand also limits solubility of Cu and Zn, as these are metals of concern to Thailand groundwater. Switzerland and Japan regulate management of solid wastes by measuring heavy metals and salts as tested by a sequential leaching method using carbonated water simulating rainwater and de-ionized water sequential testing. Additionally, U.S. EPA land disposal restrictions prohibit the land disposal of solid waste leaching in excess of maximum allowable concentrations upon performance of the TCLP analysis. The land disposal regulations require that hazardous wastes are treated until the heavy metals do not leach at levels from the solid waste at levels above the maximum allowable concentrations prior to placement in a surface impoundment, waste pile, landfill or other land disposal unit as defined in 40 C.F.R. 260.10.

U.S. Pat. No. 5,202,033 describes an in-situ method for decreasing Pb TCLP leaching from solid waste using a combination of solid waste additives and additional pH controlling agents from the source of phosphate, carbonate, and sulfates.

U.S. Pat. No. 5,037,479 discloses a method for treating highly hazardous waste containing unacceptable levels of TCLP Pb such as lead by mixing the solid waste with a buffering agent selected from the group consisting of magnesium oxide, magnesium hydroxide, reactive calcium carbonates and reactive magnesium carbonates with an additional agent which is either an acid or salt containing an anion from the group consisting of Triple Superphosphate (TSP), ammonium phosphate, diammonium phosphate, phosphoric acid, boric acid and metallic iron.

U.S. Pat. No. 4,889,640 discloses a method and mixture from treating TCLP hazardous lead by mixing the solid waste with an agent selected from the group consisting of reactive calcium carbonate, reactive magnesium carbonate and reactive calcium magnesium carbonate.

U.S. Pat. No. 4,652,381 discloses a process for treating industrial wastewater contaminated with battery plant waste, such as sulfuric acid and heavy metals by treating the waste waster with calcium carbonate, calcium sulfate and calcium hydroxide to complete a separation of the heavy metals.

SUMMARY OF THE INVENTION

One aspect of the invention pertains to a method of reducing the solubility of a mixture of heavy metal bearing paint residue and spent paint removal media that is generated when the blast media contacts and removes the heavy metal bearing paint. The method comprises contacting a mixture comprising paint residue and spent paint removal media with at least one heavy metal stabilizing agent of a physical shape, density, and in an amount effective in reducing the leaching of heavy metal to a level no more than hazardous waste lower limit as established under USEPA RCRA regulations 40 CFR part 261.24, as determined in an EPA TCLP test, performed on the stabilized material or waste, as set forth in the Federal Register, vol. 55, no. 126, pp. 26985-26998 (Jun. 29, 1990). The at least one heavy metal stabilizing agent can resist phase-separation or sifting-separation from blast media in a pre-mixed storage device and/or pressurized media and stabilizer pre-blend pot prior to nozzle discharge. Further, the at least one heavy metal stabilizing agent can resist embedding onto the media blasted substrate as seen by the human naked eye.

The at least one heavy metal stabilizing agent is selected from the group consisting of calcium phosphates, Portland Cement, cement kiln dust, lime kiln dust, lime, silicates, sulfides, iron, quicklime, phosphate complexers chlorides, iron and/or aluminum; wet process amber phosphoric acid, wet process green phosphoric acid, coproduct phosphoric acid solution from aluminum polishing, technical grade phosphoric acid, hexametaphosphate, polyphosphate, calcium orthophosphate, superphosphates, triple superphosphates, single superphosphate, ordinary superphosphates, crop production phosphates, phosphate fertilizers, phosphate rock, beef or pork bone meal phosphate, fishbone meal phosphates, bone char phosphate, tetrapotassium polyphosphate, monocalcium phosphate, monoammonia phosphate, diammonium phosphate, dicalcium phosphate, dicalcium phosphate dihydrate, tricalcium phosphate, trisodium phosphate, salts of phosphoric acid, and combinations thereof.

The at least one heavy metal stabilizing agent is applied to the mixture of paint residue and removal media within an OSHA containment structure or collection device. For example, the contacting step can be performed within the collection device prior to the device exhaust air filtration cyclone or baghouse. In one aspect, the collection device can be a vacuum collection device. For example, the contacting step can be performed within the vacuum collection device after the device exhaust air filtration cyclone or baghouse and before or during the discharge of the paint residue to an accumulation tank.

In one aspect, the at least one heavy metal stabilizing agent is pre-mixed with a paint removal media, such as but not limited to solid, semi-solid or water blasting media, prior to contact with the paint. In another aspect, the at least one heavy metal stabilizing agent can be mixed with the paint removal media in-line, such as at the nozzle just before substrate impact.

According to another aspect of the invention, the method can be performed by the combination of at least one heavy metal stabilizing agent and at least one complexing agent, where the at least one complexing agent allows for the formation of low toxicity and low solubility solid phase mineral, from the paint residue and removal media mixture available heavy metals and the at least one heavy metal stabilizing agent and removal media matrix. Examples of low toxicity and low solubility solid phase minerals include, but are not limited to, Lead Phosphate, Lead Chloropyromorphite, Lead Corkite, Lead Plumbogummite, Lead Sulfide, Lead Carbonate, Ferric Arsenate and Trivalent Chromium Hydroxide.

In one aspect, the at least one heavy metal stabilizing agent and the at least one complexing agent are pre-mixed with a paint removal media, such as but not limited to solid, semi-solid or water blasting media, prior to contact with the paint. In another aspect, the at least one heavy metal stabilizing agent and the at least one complexing agent can be mixed with the paint removal media in-line, such as at the nozzle just before substrate impact.

The invention provides an optimal method for stabilization of heavy metal bearing paint residue subject to acid and water leaching tests or leach conditions by addition of environment safe, worker safe, multi-media compatible, non-separating, non-embedding, stabilizing agent and optional complexing agent(s) to the blast media, thus allowing for pre-blending of stabilizer and blast media and field production of a uniform and steady state stabilizer within media for stabilization outside or within an OSHA containment building or collection device, such that leaching of heavy metals such as lead are inhibited to desired levels. The resultant stabilized paint residue and spent blast media mixture is suitable for on-site reuse, off-site reuse, or disposal as RCRA non-hazardous waste. Complexing agent(s) is an option if it is desirable to produce waste that has a molecular form safe for ingestion, for landfill cover, sale to smelters, or cement manufacturing.

DETAILED DESCRIPTION

Environmental regulations throughout the world such as USEPA regulations written under RCRA and CERCLA require heavy metal bearing waste, heavy metal bearing contaminated soils and materials producers to manage such materials and wastes in a manner safe to the environment and protective of human health. In response to these regulations, environmental engineers and scientists have developed numerous means to control heavy metals, mostly through chemical applications which convert the regulatory leaching matrix solubility of the material and waste character to a less soluble form, thus passing leach tests and allowing the wastes to be either reused on-site or disposed at local landfills without further and more expensive control means such as hazardous waste disposal landfills or regional TSDF facilities designed to provide metals stabilization. The primary focus of scientists has been on reducing regulatory leach matrix solubility of heavy metals such as lead, cadmium, chromium, arsenic and mercury, as these were and continue to be the most significant mass of metals contamination in soils. Materials such as paint residues, cleanup site wastes such as battery acids and slag wastes from smelters and incinerators are major lead sources.

There exists a demand for improved and less costly regulatory test matrix leaching control methods of heavy metals from paint residue removal and recovery projects that allows for stabilization of heavy metals in paint residue and spent blast media into non-hazardous waste or materials that are non-embedding on substrate surface and meeting the SSPC SP10 criteria of no visual substrate contamination from blast media or stabilizer amendment, stable, environmental-safe, worker-safe, non-toxic, non-separating stabilizer and media, substrate compatible, and multi-media compatible, and suitable for blending with dry blasting media, semi-wet sponge blast media, solid media (e.g., plastic to metal balls, sand, slag) and high pressure water paint blast systems. The subject method allows for stabilized paint residue and spent media production and handling either outside of or within the paint residue OSHA enclosure after residue removal from the structure and/or within devices used to collect residue from the OSHA container and before the discharge of the residues into accumulation containers.

The present invention discloses a heavy metal bearing mixed paint residue and spent paint removal media TCLP Pb solubility reduction method by contact of heavy metal bearing paint and substrate with a pre-blend of blast removal media and optimal engineered heavy metal stabilizer that resists phase or sifting separation from the blast media and has no embedding of the stabilizer onto the painted surface substrate. The stabilizers are specifically engineered and improved over existing pre-blended stabilizers and blast media, given that this new pre-blended media and stabilizer method uses only environmental-safe, worker-safe, non-toxic, non-separating and non-sifting particle from blast media, substrate compatible, multi-media compatible stabilizers suitable for blending with dry blasting media, semi-wet sponge blast media, and high pressure water paint blast systems, non-embedding characteristic such that the post-blasted and post-stabilizer paint surface substrate has no human naked eye noticeable substrate embedded stabilizer, and capable of producing a waste stabilized matrix with TCLP Pb leaching level of less than 5.0 ppm. It has been observed by the inventor that current heavy metal airspace control and abatement systems (OSHA Tents) used worldwide at paint removal projects are not capable of collecting 100% of the newly generated stabilizer and paint blend fine particulates and dust particles, and thus the existing technologies are lacking in production of environmental and worker exposure safe resultant minerals and molecules that are also capable of being used with the dry and wet abrasive removal techniques used by paint removal and collection contractors.

The preferred stabilizer for lead bearing paint and spent media and pre-blending into a non-separating/sifting and non-embedment matrix is flake shaped, 50 to 100 US Sieve size, phosphate source fish bone meal, beef or pork bone meal, bone char and/or phosphate rock. Also stabilizers can include granulated or pelletized calcium phosphate sources such as single superphosphate, triple superphosphate, dicalcium phosphate, dicalcium phosphate dihydrate, monocalcium phosphate, and tricalcium phosphate for substitution of Pb into calcium phosphate apatite mineral(s). Fish bone meal, beef and pork bone meal, granular bone char and phosphate ore were found to not embed onto the painted substrate, whereas calcium phosphate above 1.0% dosage by weight of media had embedment and residual phosphate stabilizer on all substrate tests conducted by FESI LABS and field pilot testing by its Developer, GDSP of Riddle, Oreg. A solution to calcium phosphate embedment and clumping on substrate was reduction of dosage of the calcium phosphate stabilizer to less than 1.0% by weight of media, such as 0.5% by weight dosage of a milled pulverized granular triple superphosphate.

The present invention provides an optimal method of reducing the regulatory test matrix solubility of heavy metal bearing paint residue and mixed spent blast media. Paint residue heavy metal solubility is controlled by the invention as measured under TCLP, SPLP, CALWET, MEP, rainwater and surface water leaching conditions as well as under regulatory water extraction test conditions as defined by waste control regulations in China, Taiwan, Japan, Canada, UK, Mexico, Switzerland, Germany, Sweden, The Netherlands and under American Nuclear Standards for sequential leaching of wastes by de-ionized water.

Suitable acetic acid leach tests include the USEPA SW-846 Manual described Toxicity Characteristic Leaching Procedure (TCLP) and Extraction Procedure Toxicity Test (EP Tox) now used in all Provinces of Canada except Quebec. Briefly, in a TCLP test, 100 grams of waste are tumbled with 2000 ml of dilute and buffered or non-buffered acetic acid for 18 hours and then filtered through a 0.75 micron filter prior to nitric acid digestion and final ICP analyses for total "soluble" metals. The extract solution is made up from 5.7 ml of glacial acetic acid and 64.3 ml of 1.0 normal sodium hydroxide up to 1000 ml dilution with reagent DI water.

Suitable DI carbonated water leach tests include the Japanese leach test which tumbles 50 grams of composited waste sample in 500 ml of water for 6 hours held at pH 5.8 to 6.3, followed by centrifuge and 0.45 micron filtration prior to analyses. Another suitable distilled water $CO_2$ saturated method is the Swiss protocol using 100 grams of cemented waste at 1 $cm^3$ in two (2) sequential water baths of 2000 ml. The concentration of lead and salts are measured for each bath and averaged together before comparison to the Swiss criteria.

Suitable citric acid leach tests include the California Waste Extraction Test (WET), which is described in Title 22, Section 66700, "Environmental Health" of the California Health & Safety Code. Briefly, in a WET test, 50 grams of waste are tumbled in a 1000 ml tumbler with 500 grams of sodium citrate solution for a period of 48 hours. The concentration of leached lead is then analyzed by Inductively-Coupled Plasma (ICP) after filtration of a 100 ml aliquot from the tumbler through a 45 micron glass bead filter.

Unlike the present invention, prior art has focused on reducing regulatory test matrix (such as USEPA—TCLP, SPLP, Japan EPA—DI, California EPA—STLC) solubility of heavy metals, mostly lead, from paint residues by application of phosphate sources blended with Latex paint and silicates onto surfaces prior to blasting media removal (Forrester U.S. Pat. No. 6,515,053 B1), application of certain phosphates blended with blast media used for painted surface removal by blasting media (Forrester U.S. Pat. No. 6,186,939 B1), and post-paint removal blasting application of known heavy metal stabilizers such as phosphates, carbonates, cement, silicates, with or without mineral complex agents, in accumulation tanks or waste piles after collection or accumulation of the paint residue (Forrester U.S. Pat. No. 5,846,178, Forrester U.S. Pat. No. 5,722,928 and Forrester U.S. Pat. No. 5,536,899 and cited art from those applications). Previous invented methods failed to recognize the importance of applying a blended mixture of paint removal media and paint residue stabilizer with or without mineral complex agents that are (1) engineered to be safe to the environment and biological communities either outside of or inside the painted structure OSHA containment building such as worker-safe regarding inhalation-ingestion-dermal contact and worker non-toxic, (2) chemically compatible with painted surface substrate and compatible with any primer or applied paint on the substrate after blasting with media and stabilizer composite, (3) multi-media compatible and thus suitable for blending with dry blasting media, semi-wet sponge blast media, and high pressure water paint blast systems, (4) of a geometry, such as flake and plate form, that allows for pre-blending with blast media such as Coarse Black Beauty Blast Media and Green Diamond Sand Products, such that the pre-blend of stabilizer with blast media remains uniform and non-separated in a three-dimensional matrix, from the time of mechanical blending production to pre-blend packaging, shipment, and finally to delivery, (5) of size, shape, mass weight, retained moisture content, and particle size distribution such that the stabilizer does not embed onto the painted substrate and thus be in compliance with painting industry standards that require no human naked eye visible embedded stabilizer chemical on the cleaned substrate surfaces prior to painting application, referred to as SP-10 criteria under the Society of Surface and Painting Contractors guidelines (SSPC), and (6) of such small particle size that the stabilizer provides sufficient large surface area to allow for surface dissolution of calcium and ion exchange of calcium with lead and other heavy metals such as Chromium, Arsenic and Cadmium.

The resultant mixed stabilizer, paint residue, and spent media, should not cause or contribute to adverse exposures in airspace, surface and ground waters, and grounds, thus avoiding production of conditions that could be corrosive, caustic, pH adverse (pH above 10.0 or below 6.5), or other site specific conditions determined to be adverse or to all potential environmental receptors.

Given that the weight based dosage of stabilizer under this technology method is commonly very low, from 0.5% to about 2.0% by of the weight of blast media, and that TCLP Pb RCRA compliance composite samples collected of mixed blast media, lead stabilizer and lead bearing paint residue, must be uniform in order for the stabilizer dosage to be of sufficient quantity, it is very important that the stabilizer remain suspended in a three-dimensional uniform manner within the solid blast media matrix, and thus be introduced onto the blasted paint waste and substrate at a uniform and steady-state manner, which in turn allows for uniform distribution of the stabilizer "seed" into the mixed media and residue, and thus at the correct stabilizer dose to waste ratio that has been determined by prior lab analyses as the minimum required to assure that the stabilized blend of residue and media meets non-hazardous waste criteria, such as less than 5.0 ppm TCLP Pb in the US, Taiwan, Philippines and Canada. In order to maintain the stabilizer in a suspended three-dimensional uniform manner, the density and geometric shape of the stabilizer is selected so that it will float on the paint removal media when the media is shaken, for example. The subject pre-mixed, substrate compatible, non-toxic, non-separating, non-embedding, TCLP Pb stabilizer and blast media method allows for stabilized paint residue and spent paint removal media production and handling either outside of or within the paint residue OSHA enclosure after residue removal from the structure and/or within devices used to collect residue from the OSHA container and before the discharge of the residues into accumulation containers. Prior art stabilizers, mostly available in powder or fine form and sometimes in a large pelletized shape which can plug pneumatic blast nozzles, have a tendency to sift down from the three dimensional media shipping package, thus not providing sufficient stabilizer during the consumption of the top layer and middle layer of media, and too much stabilizer when drawing vacuum or atomized from the base of the pre-blend container or pot, and also tend to embed dry stabilizer chemicals onto the substrate surfaces due to stabilizer makeup, chemistry, mass, adhesion capability, moisture content, shape, and particle size distribution.

The preferred stabilizer for lead (the most predominant source of RCRA hazardous waste regulated heavy metal in paint waste residue and spent media mixtures) would be dry to semi-dry, flake shape, large surface area to mass ratio, non-embedding character such as beef or pork bone meal, fish bone meal (whitefish, salmon, crab) meal, bone char, and milled phosphate rock, and milled or size regulated calcium phosphate sources such as monocalcium phosphate, single superphosphate, triple superphosphate, dicalcium phosphate, dicalcium phosphate dihydrate, monocalcium phosphate, and tricalcium phosphate for substitution of Pb into calcium phosphate apatite mineral(s). Ground beef or pork bone meal and milled fishbone meal with a flake shaped geometry, 0% to 10% moisture content, 16 to 100 US Sieve mesh with most retained at 50 and 100 US Sieve, was found to be the best uniform non-separating and non-embedding stabilizer with blended GDSP sand media, likely due to the floating nature of the flake on the GDSP media as well as the resultant density of the flake bone meal and milled fishbone meal.

It has also been found that the calcium phosphates, monodicalcium phosphate in defluorinated feed form, and dicalcium phosphate dihydrate, can also stabilize chromium and arsenic. Dicalcium phosphate dihydrate is of specific value as a stabilizer, as it is extremely safe (being a food grade chemical and used in toothpaste and pills worldwide), as well as being in a form both in dry seed and after introduction into the regulatory extraction fluid which has highly active surface sites for lead and heavy metal ion-exchange and precipitation, as well as a physical composition and flake or pelletized form that allows for excellent uniform and steady-state blending and non-sifting during handling and shipping after blending.

These stabilizers like beef and pork bone meal and milled fishbone meal, bone char, milled phosphate rock, and calcium phosphate stabilizer additives also have the extremely unique capability to be applied as a dry flake, dry granular, or fine colloidal mixture additive that will easily remain suspended in solution and convey uniformly with pressurized pots and media venturi pickup blast methods, given that the water solubility of calcium phosphates are very low and thus avoid wetted media exothermic curing as would happen with wetting or semi-wetting of alternate vendor technologies such as Blastox® calcium silicates and calcium oxides, both of which are highly water soluble and highly hydroscopic and reactive. The most significant advantage with production of lead substituted apatite from milled beef and pork bone meal and milled fishbone meal and milled phosphate rock and calcium phosphate minerals in paint residue, is that the solubility constant, and hence leachability and bioavailability, are greatly reduced in this true apatite form at Ksp 10E-92, as compared to the simple lead-silicate and lead-oxide minerals forms at Ksp values greater than 10E-5 from Blastox® type amended solid media.

The preferred non-separating, non-embedding, leaching matrix control, and least expensive paint stabilizer for lead (the most predominant source of regulated paint residues) would be fishbone meal, beef and pork bone meal, and bone char in dry, flake form from 50 to 100 mesh US Sieve sizing, then phosphate rock in flake and same small sized form, followed by flake or pelletized calcium phosphate sources such as single superphosphate, triple superphosphate, dicalcium phosphate, dicalcium phosphate dihydrate, monocalcium phosphate, and tricalcium phosphate for substitution of Pb into calcium phosphate apatite mineral(s). It has been found that the fishbone meal, beef and pork bone meal, bone char, and phosphate rock apatites and calcium phosphates monodicalcium phosphate deflorinated feed form, and dicalcium phosphate dihydrate, can also stabilize chromium and arsenic. Dicalcium phosphate dihydrate is of specific value as a stabilizer, as it is extremely safe (being recognized as a food grade chemical and commonly used in toothpaste and pills worldwide), as well as being in a form which has highly active surface sites for lead and heavy metal ion-exchange and precipitation, as well as a physical composition and form that allows for excellent uniform and steady-state blending and non-sifting and non-separating after blending. These calcium phosphate stabilizer additives also have the extremely unique capability to be applied as a dry flake, dry granular, or slurry mixture additive that will easily suspend in solution and travel uniformly with pressurized pots and media venturi pickup blast methods, given that the water solubility of calcium phosphates are very low and thus avoid wetted media exothermic curing as would happen with wetting or semi-wetting of alternate vendor methods such as Blastox® generated calcium silicates and calcium oxides, both of which are highly water soluble and highly hydroscopic and reactive. The most significant advantage with production of lead substituted apatites and calcium phosphate minerals in paint residue is that the solubility constant, and hence leachability and bioavailability, are greatly reduced in this true apatite form at Ksp 10E-92, as compared to the simple lead-silicate and lead-oxide minerals forms at Ksp values greater than 10E-5 from alternate vendor methods such as Blastox® amended solid media.

The stabilizer agent selection from natural fishbone meal, beef or pork bone meal, bone char and phosphate rock to produced calcium phosphates, flake or granular geometry, particle size distribution from 50 to 100 US Sieve, moisture content, and TCLP Pb stabilization dose rate applied with the blasting media (such as GDSP, garnet, black beauty, slag, shell, water), and stabilizer to media blending method (such as ball mill, cone blending, tumbling, slurry cycling) can be engineered for each type of paint residue composition and environment anticipated, such as lead, chromium, arsenic, copper, zinc or combinations in paint residues produced.

Although the exact stabilizer, flake or pelletized granular geometry, moisture content, sieve sizing, optimal TCLP dosing, lowest embedment source, best non-separation source, and target heavy metal mineral formations are undetermined at this time, it is expected that when heavy metals in paint residue such as lead come into contact with the flake or granular stabilizing agent and blended media with sufficient reaction matrix, time and energy, low-soluble apatite minerals forms such as a Pb, Cr and As substituted hydroxyapatites, through substitution or surface bonding, will form at the point of media and stabilizer contact with paint surfaces, which are less soluble than the heavy metal element or molecule originally in the paint residue. There exist several thousand possible mineral low-solubility combinations possibly formed given the paint residue composition and possible stabilizer additives identified. Certain stabilizers may provide for long-term stabilization and passage of leach tests beyond that regulated, and thus be more suited to paint residues intended for reuse or land application. The stabilization design engineer is thus provided a multitude of stabilizer options which can be tested for final recipe solubility under the various leach tests of interest.

Although the flake or granular fishbone meal, beef or pork bone meal, bone char, phosphate rock, calcium phosphates including monocalcium phosphate, single superphosphate, ordinary superphosphate, triple superphosphate, dicalcium phosphate, dicalcium phosphate dihydrate, and tricalcium phosphate, and non-embedding and non-separation characters are the preferred embodiments, examples of possible additional or separate suitable stabilizing and/or complexing agents include, but are not limited to, chlorides, iron, aluminum, ferric and ferrous sulfates, aluminum sulfate, flocculants, coagulants, nuclei particulates, ligands, cement kiln dust, lime kiln dust, sulfides, iron, silicates, phosphate fertilizers, phosphate rock, pulverized phosphate rock, calcium orthophosphates, trisodium phosphates, calcium oxide (quicklime), dolomitic quicklime, natural phosphates, phosphoric acids, dry process technical grade phosphoric acid, wet process green phosphoric acid, wet process amber phosphoric acid, black phosphoric acid, merchant grade phosphoric acid, aluminum finishing phosphoric and sulfuric acid solution, hypophosphoric acid, metaphosphoric acid, hexametaphosphate, tertrapotassium polyphosphate, polyphosphates, trisodium phosphates, pyrophosphoric acid, fishbone phosphate, animal bone beef or pork phosphate meal, herring meal, phosphorites, and combinations thereof. Salts of phosphoric acid can be used and are preferably alkali metal salts such as, but not limited to, trisodium phosphate, dicalcium phosphate, disodium hydrogen phosphate, sodium dihydrogen phosphate, tripotassium phosphate, dipotassium hydrogen phosphate, potassium dihydrogen phosphate, trilithium phosphate, dilithium hydrogen phosphate, lithium dihydrogen phosphate or mixtures thereof.

The select geometry, moisture content, particle size distribution such as 50 to 100 mesh sieve, and dosage of stabilizing agent and possible additional agent(s) and complexing additive combinations used, according to the method of invention, depend on various factors including desired non-embedding on substrate, non-separation from the blast media, TCLP solubility reduction potential (such as less than 5.0 ppm or 0.75 ppm TCLP Pb as required under 40 CFR Part 261.24 or 40 CFR part 268 LDR disposal limitation for land disposed stabilized paint residue and media mixtures), desired mineral toxicity (such as less than 50% lethal dose when exposed to a batch aquatic toxicity test using fathead minnows under the WADOE toxicity regulations), and desired mineral formation relating to toxicological and site environmental control objectives (such as lead pyromorphites, chloropyromorphite, corkite, plumbogummite). It has been found that a pre-blend mixture of 2% milled dry fishbone meal, beef or pork bone meal, and bone char by weight blast media as GDSP, 50 to 100 mesh PSD US Sieve, flake character geometry, dry, or 0.5% to 1% pulverized or granular calcium phosphates such as triple superphosphate or granular single superphosphate, or mono, di, or tricalcium phosphates feeds and fertilizers, were sufficient for TCLP Pb stabilization of a media/stabilizer/residue waste composite to less than RCRA 5.0 ppm limit with no embedding of beef or pork bone meal or calcium phosphate on the steel substrate and no separation of stabilizer from the GDSP media during handling and storage. However, the foregoing is not intended to preclude yet higher or lower pre-blend dose of stabilizing agent(s) or combinations of stabilizer geometries and complexing agents.

The examples below are merely illustrative of this invention and are not intended to limit it thereby in any way.

EXAMPLE 1

Lead (Pb) bearing painted steel beam sample was blast cleaned with (0.12.0) Beef Bone Meal (BBM), 0.30.0 Pork Bone Meal (PBM), Fishmeal Meal (FBM), Beef Bone Char (BBC), Phosphate Rock (PR), Monodicalcium Phosphate feed grain size (MDCP), and Triple Superphosphate (TSP) or Single Superphosphate (SSP), all sized from 30 to 100 US Sieve mesh, granular or flake geometry, all dry to the touch with measured oven-dry retained moisture of 1% to 7%, all pre-blended with Green Diamond Sand Product (GDSP) coarse grade sand. The resulting waste mixture after sand blast removing the substrate paint was analyzed for TCLP Pb, and the substrate was visually observed for embedded particles of blast media or stabilizer on the newly cleaned substrate surface. The pre-blend was also evaluated for its ability to stay combined in a uniform column, by table shaking after blending and observing the stabilizers ability to sift separate from the blast media, simulating same that could occur in blasting pots and thus complicate the blends ability to produce a uniform mixture of stabilizer and blast media under field conditions.

TABLE 1

| Sample | TCLP Pb (ppm) | Embedding | Separation |
|---|---|---|---|
| Baseline GDSP + Pb | 20.0 | None | NA |
| 2% FBM Grain | 1.6 | Slight | None |
| 2% BBC Grain | 1.5 | Slight | None |
| 2% BBM Flake | 1.3 | None | None |
| 4% PR Colloidal | 27 | NT | 50% |
| 8% PR Colloidal | 24 | NT | 50% |
| 2% MDCP Grain | 0.55 | Visual Pits | 50% to 60% |
| 2% DCP Flake | 0.37 | Visual Pits | None |
| 2% PBM | 0.27 | None | None |
| 1% TSP-100 | 0.65-0.71 | None | Low |
| 2% TSP-100 | 0.23 | Slight | Slight |
| 2% SSP-100 | 0.24 | None | Low |

While this invention has been particularly shown and described with reference to preferred embodiments thereof, it will be understood by those skilled in the art that various changes in form and details may be made therein without departing from the spirit and scope of the invention as defined by the appended claims.

What is claimed is:

1. A method of reducing the solubility of a mixture of heavy metal bearing paint residue and spent paint removal media under leach test conditions, comprising contacting a mixture of heavy metal bearing paint residue and spent paint removal media with at least one heavy metal stabilizing agent of a physical shape, density, and in an amount effective to reduce the solubility of the heavy metal under leach test conditions to a level no more than a hazardous waste lower limit as established under USEPA RCRA regulations 40 CFR part 261.24, as determined in an EPA TCLP test performed on the stabilized material or waste, as set forth in the Federal Register, vol. 55, no. 126, pp. 26985-26998 (Jun. 29, 1990), wherein the at least one heavy metal stabilizing agent resists phase-separation or sifting-separation from paint removal media in a pre-mixed storage device and/or pressurized media and stabilizer pre-blend pot prior to nozzle discharge, and further wherein the at least one heavy metal stabilizing agent resists embedding onto the media blasted substrate as seen by the human naked eye.

2. The method of claim 1, wherein the at least one heavy metal stabilizing agent is selected from the group consisting of calcium phosphates, Portland Cement, cement kiln dust, lime kiln dust, lime, silicates, sulfides, iron, quicklime, phosphate complexers chlorides, iron and/or aluminum; wet process amber phosphoric acid, wet process green phosphoric acid, coproduct phosphoric acid solution from aluminum polishing, technical grade phosphoric acid, hexametaphosphate, polyphosphate, calcium orthophosphate, superphosphates, triple superphosphates, single superphosphate, ordinary superphosphates, crop production phosphates, phosphate fertilizers, phosphate rock, beef or pork bone meal phosphate, fishbone meal phosphates, bone char phosphate, tetrapotassium polyphosphate, monocalcium phosphate, monoammonia phosphate, diammonium phosphate, dicalcium phosphate, dicalcium phosphate dihydrate, tricalcium phosphate, trisodium phosphate, salts of phosphoric acid, and combinations thereof.

3. The method of claim 1, wherein the at least one heavy metal stabilizing agent contacts the mixture of paint residue and paint removal media within an OSHA containment structure.

4. The method of claim 1, wherein the at least one heavy metal stabilizing agent contacts the mixture of paint residue and paint removal media within a collection device.

5. The method of claim 1, wherein the at least one heavy metal stabilizing agent contacts the mixture of paint residue and paint removal media within a collection device prior to the device exhaust air filtration cyclone or baghouse.

6. The method of claim 1, wherein the at least one heavy metal stabilizing agent is contacted with the mixture of paint residue and paint removal media within a vacuum collection device after the device exhaust air filtration cyclone or baghouse and before the discharge of the paint residue to an accumulation tank.

7. The method of claim 1, wherein the at least one heavy metal stabilizing agent is contacted with the mixture of paint residue and paint removal media within a vacuum collection device after the device exhaust air filtration cyclone or baghouse and during the discharge of the mixture of paint residue and removal media to an accumulation tank.

8. The method of claim 1, wherein the at least one heavy metal stabilizing agent is pre-mixed with the paint removal media (solid, semi-solid, or water blasting) prior to contact with the heavy metal bearing paint residue.

9. The method of claim 1, wherein the paint removal media is solid abrasive, semi-wet sponge material, or water.

10. The method of claim 1, wherein reduction of solubility is to a level no more than non-hazardous levels as determined under leach tests required by regulation in countries other than the USA including but not limited to Switzerland, UK, Mexico, Taiwan, Japan, Thailand, China, Canada and Germany.

11. The method of claim 1, further comprising contacting the mixture of paint residue and spent paint removal media with at least one complexing agent to allow for formation of low toxicity and low solubility solid phase mineral, from the paint residue and removal media mixture available heavy metals and introduced stabilizers and removal media matrix, such as Lead Phosphate, Lead Chloropyromorphite, Lead Corkite, Lead Plumbogummite, Lead Sulfide, Lead Carbonate, Ferric Arsenate and Trivalent Chromium Hydroxide.

12. The method of claim 2, wherein the at least one heavy metal stabilizing agent is selected to allow for generation of heavy metal minerals at available paint residue surfaces which have low water and simulated rainwater extract solubility and resist leaching under SPLP leaching test USEPA method 1310.

13. The method of claim 2, wherein the at least one heavy metal stabilizing agent is selected such that the media-blasted substrate is compatible with sequential application of paint surface cleaners, primers and paints.

14. The method of claim 2, wherein the at least one heavy metal stabilizing agent is selected to provide for production of stabilized heavy metal bearing particulate, stabilized heavy metal contaminated residue, stabilizer contacted media, stabilizer contacted substrates, and residual airborne or deposited stabilizer chemicals, that are safe to workers upon various individual or combination exposures including dermal contact, inhalation, ingestion, and project synergistic exposures.

15. The method of claim 2, wherein the at least one heavy metal stabilizing agent is selected to provide for production of stabilized heavy metal bearing particulate, stabilized heavy metal contaminated residue, stabilizer contacted media, stabilizer contacted substrates, and residual airborne or deposited stabilizer chemicals, that are safe to the project direct and adjacent environments and biological communities.

16. A method of reducing the solubility of a mixture comprising heavy metal bearing paint residue and spent paint removal media under leach test conditions, the method comprising contacting the mixture comprising paint residue and spent paint removal media with a combination of at least one heavy metal stabilizing agent and at least one complexing agent, wherein the at least one heavy metal stabilizing agent is of a physical shape, density, and in an amount effective in reducing the solubility of heavy metal under leach test conditions to a level no more than hazardous waste lower limit as established under USEPA RCRA regulations 40 CFR part 261.24, as determined in an EPA TCLP test performed on the stabilized material or waste, as set forth in the Federal Register, vol. 55, no. 126, pp. 26985-26998 (Jun. 29, 1990), wherein the at least one heavy metal stabilizing agent resists phase-separation or sifting-separation from blast media in a pre-mixed storage device and/or pressurized media and stabilizer pre-blend pot prior to nozzle discharge, and further wherein the stabilizer agent resists embedding onto a media blasted substrate as seen by the human naked eye;

wherein the at least one complexing agent is selected to allow for formation of low toxicity and low solubility solid phase mineral, from the paint residue and removal media mixture available heavy metals and introduced stabilizers and removal media matrix, such as Lead Phosphate, Lead Chloropyromorphite, Lead Corkite, Lead Plumbogummite, Lead Sulfide, Lead Carbonate, Ferric Arsenate, and Trivalent Chromium Hydroxide.

* * * * *